(12) United States Patent
Putatunda et al.

(10) Patent No.: US 10,992,652 B2
(45) Date of Patent: Apr. 27, 2021

(54) METHODS, SYSTEMS, AND COMPUTER READABLE MEDIA FOR MONITORING ENCRYPTED NETWORK TRAFFIC FLOWS

(71) Applicant: Keysight Technologies Singapore (Sales) Pte. Ltd., Singapore (SG)

(72) Inventors: Amritam Putatunda, Woodland Hills, CA (US); Partha Majumdar, Woodland Hills, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 51 days.

(21) Appl. No.: 15/980,699

(22) Filed: May 15, 2018

(65) Prior Publication Data

US 2019/0068564 A1    Feb. 28, 2019

Related U.S. Application Data

(60) Provisional application No. 62/550,558, filed on Aug. 25, 2017.

(51) Int. Cl.
*H04L 29/06* (2006.01)
*H04L 12/26* (2006.01)
(Continued)

(52) U.S. Cl.
CPC ...... *H04L 63/0464* (2013.01); *G06F 9/45558* (2013.01); *H04L 43/062* (2013.01);
(Continued)

(58) Field of Classification Search
CPC ... H04L 63/0464; H04L 43/062; H04L 43/12; H04L 63/06; H04L 63/08; H04L 63/1408; H04L 63/18; H04L 67/14; G06F 9/45558
See application file for complete search history.

(56) References Cited

U.S. PATENT DOCUMENTS 5,557,678 A    9/1996  Ganesan
6,330,671 B1  12/2001  Aziz
(Continued)

FOREIGN PATENT DOCUMENTS

EP    3528430 A1    8/2019
WO    2016176070 A1  11/2016

OTHER PUBLICATIONS

Non-Final Office Action for U.S. Appl. No. 15/608,369 (dated Oct. 31, 2019).

(Continued)

*Primary Examiner* — Yonas A Bayou (57) ABSTRACT

Methods, systems, and computer readable media for monitoring encrypted packet communications are disclosed. According to one method executed at an encryption aware visibility (EAV) device, the method includes receiving copies of encrypted network traffic flow records belonging to at least one communication session involving a monitored application and obtaining, from a secure session management (SSM) server, session decryption information (SDI) via a secure backchannel interface connection, wherein the session decryption information includes cryptographic keys generated by the SSM server to establish the at least one communication session. The method further includes using the cryptographic keys to decrypt the copies of encrypted network traffic flow records to produce decrypted network traffic flow records.

17 Claims, 6 Drawing Sheets

(51) Int. Cl.
  *H04L 29/08* (2006.01)
  *G06F 9/455* (2018.01)
(52) U.S. Cl.
  CPC .............. *H04L 43/12* (2013.01); *H04L 63/06* (2013.01); *H04L 63/08* (2013.01); *H04L 63/1408* (2013.01); *H04L 63/18* (2013.01); *H04L 67/14* (2013.01); *G06F 2009/45591* (2013.01); *G06F 2009/45595* (2013.01); *H04L 63/0272* (2013.01); *H04L 63/0281* (2013.01); *H04L 63/166* (2013.01)

(56) References Cited

U.S. PATENT DOCUMENTS

| | | |
|---|---|---|
| 6,480,488 B1 | 11/2002 | Huang |
| 6,684,331 B1 | 1/2004 | Srivastava |
| 7,340,744 B2 | 3/2008 | Chandwadkar et al. |
| 7,363,353 B2 | 4/2008 | Ganesan et al. |
| 7,373,412 B2 | 5/2008 | Colas et al. |
| 7,421,506 B2 | 9/2008 | Ni et al. |
| 7,562,213 B1 | 7/2009 | Timms |
| 7,634,650 B1 | 12/2009 | Shah et al. |
| 7,778,194 B1 | 8/2010 | Yung |
| 7,971,240 B2 | 6/2011 | Guo et al. |
| 8,270,942 B2 | 9/2012 | Zabawskyj et al. |
| 8,457,126 B2 | 6/2013 | Breslin et al. |
| 8,514,756 B1 | 8/2013 | Ramachandra et al. |
| 8,566,247 B1 | 10/2013 | Nagel et al. |
| 8,595,835 B2 | 11/2013 | Kolton et al. |
| 8,601,152 B1 | 12/2013 | Chou |
| 8,654,974 B2 | 2/2014 | Anderson et al. |
| 8,788,805 B2 | 7/2014 | Herne et al. |
| 8,881,282 B1 | 11/2014 | Aziz et al. |
| 8,929,356 B2 | 1/2015 | Pandey et al. |
| 8,938,611 B1 | 1/2015 | Zhu et al. |
| 8,953,439 B1 | 2/2015 | Lin et al. |
| 9,065,642 B2 | 6/2015 | Zaverucha et al. |
| 9,298,560 B2 | 3/2016 | Janakiraman et al. |
| 9,380,002 B2 | 6/2016 | Johansson et al. |
| 9,392,010 B2 | 7/2016 | Friedman et al. |
| 9,407,643 B1 | 8/2016 | Bavington |
| 9,565,202 B1 | 2/2017 | Kindlund et al. |
| 9,660,913 B2 | 5/2017 | Newton |
| 9,673,984 B2 | 6/2017 | Jiang et al. |
| 9,680,869 B2 | 6/2017 | Buruganahalli et al. |
| 9,800,560 B1 | 10/2017 | Guo et al. |
| 9,807,121 B1* | 10/2017 | Levy .................. H04L 63/062 |
| 9,882,929 B1 | 1/2018 | Ettema et al. |
| 9,893,883 B1 | 2/2018 | Chaubey et al. |
| 9,906,401 B1 | 2/2018 | Rao |
| 10,063,591 B1 | 8/2018 | Jiang et al. |
| 10,079,810 B1 | 9/2018 | Moore et al. |
| 10,079,843 B2 | 9/2018 | Friedman et al. |
| 10,291,651 B1 | 5/2019 | Chaubey |
| 10,326,741 B2 | 6/2019 | Rothstein et al. |
| 10,404,597 B2 | 9/2019 | Bakshi |
| 10,419,965 B1 | 9/2019 | Kadosh et al. |
| 10,482,239 B1 | 11/2019 | Liu et al. |
| 10,516,532 B2 | 12/2019 | Taub et al. |
| 2002/0116485 A1 | 8/2002 | Black et al. |
| 2003/0004688 A1 | 1/2003 | Gupta et al. |
| 2003/0161335 A1* | 8/2003 | Fransdonk .............. G06Q 20/12 370/401 |
| 2003/0163684 A1* | 8/2003 | Fransdonk .......... H04L 63/0823 713/153 |
| 2003/0165241 A1* | 9/2003 | Fransdonk ......... G06Q 20/3823 380/258 |
| 2004/0083362 A1 | 4/2004 | Park et al. |
| 2004/0168050 A1 | 8/2004 | Desrochers et al. |
| 2004/0268148 A1* | 12/2004 | Karjala ............... H04L 41/0856 726/15 |
| 2005/0050362 A1 | 3/2005 | Peles |
| 2005/0111437 A1 | 5/2005 | Maturi |
| 2005/0160269 A1 | 7/2005 | Akimoto |
| 2006/0085862 A1 | 4/2006 | Witt et al. |
| 2006/0259579 A1 | 11/2006 | Beverly |
| 2007/0022284 A1 | 1/2007 | Vishwanathan |
| 2007/0033408 A1 | 2/2007 | Morten |
| 2007/0043940 A1* | 2/2007 | Gustave .............. H04W 12/037 713/150 |
| 2007/0078929 A1 | 4/2007 | Beverly |
| 2007/0169190 A1 | 7/2007 | Kolton et al. |
| 2008/0005782 A1 | 1/2008 | Aziz |
| 2008/0031141 A1 | 2/2008 | Lean et al. |
| 2008/0320297 A1 | 12/2008 | Sabo et al. |
| 2009/0150521 A1 | 6/2009 | Tripathi |
| 2009/0150527 A1 | 6/2009 | Tripathi et al. |
| 2009/0150883 A1 | 6/2009 | Tripathi et al. |
| 2009/0220080 A1 | 9/2009 | Herne et al. |
| 2009/0222567 A1 | 9/2009 | Tripathi et al. |
| 2009/0254990 A1 | 10/2009 | McGee |
| 2010/0250769 A1 | 9/2010 | Barreto et al. |
| 2011/0231659 A1 | 9/2011 | Sinha |
| 2011/0286461 A1 | 11/2011 | Ichino et al. |
| 2011/0289311 A1 | 11/2011 | Roy-Chowdhury et al. |
| 2012/0082073 A1 | 4/2012 | Andreasen et al. |
| 2012/0137289 A1 | 5/2012 | Nolterieke et al. |
| 2012/0210318 A1 | 8/2012 | Sanghvi et al. |
| 2012/0236823 A1 | 9/2012 | Kompella et al. |
| 2012/0304244 A1 | 11/2012 | Xie et al. |
| 2013/0054761 A1 | 2/2013 | Kempf et al. |
| 2013/0117847 A1 | 5/2013 | Friedman et al. |
| 2013/0239119 A1 | 9/2013 | Garg et al. |
| 2013/0265883 A1 | 10/2013 | Henry et al. |
| 2013/0272136 A1 | 10/2013 | Ali et al. |
| 2013/0301830 A1* | 11/2013 | Bar-El ................. H04L 63/0823 380/210 |
| 2013/0343191 A1 | 12/2013 | Kim et al. |
| 2014/0010083 A1 | 1/2014 | Hamdi et al. |
| 2014/0082348 A1* | 3/2014 | Chandrasekaran ..... H04L 63/30 713/150 |
| 2014/0115702 A1* | 4/2014 | Li ......................... H04L 9/3273 726/23 |
| 2014/0189093 A1* | 7/2014 | du Toit ............... H04L 63/0823 709/224 |
| 2014/0189861 A1 | 7/2014 | Gupta et al. |
| 2014/0189961 A1 | 7/2014 | He et al. |
| 2014/0226820 A1 | 8/2014 | Chopra et al. |
| 2014/0351573 A1* | 11/2014 | Martini ............... H04L 63/0254 713/153 |
| 2015/0026313 A1 | 1/2015 | Chawla et al. |
| 2015/0039889 A1 | 2/2015 | Andoni |
| 2015/0052345 A1 | 2/2015 | Martini |
| 2015/0113264 A1 | 4/2015 | Wang et al. |
| 2015/0124622 A1 | 5/2015 | Kovvali et al. |
| 2015/0172219 A1 | 6/2015 | Johansson et al. |
| 2015/0264083 A1 | 9/2015 | Prenger et al. |
| 2015/0281954 A1 | 10/2015 | Warren |
| 2015/0288679 A1 | 10/2015 | Ben-Nun et al. |
| 2015/0295780 A1 | 10/2015 | Hsiao et al. |
| 2015/0341212 A1 | 11/2015 | Hsiao et al. |
| 2016/0014016 A1 | 1/2016 | Guichard et al. |
| 2016/0080502 A1 | 3/2016 | Yadav et al. |
| 2016/0105469 A1 | 4/2016 | Galloway et al. |
| 2016/0105814 A1 | 4/2016 | Hurst et al. |
| 2016/0119374 A1 | 4/2016 | Williams et al. |
| 2016/0127517 A1 | 5/2016 | Shcherbakov et al. |
| 2016/0142440 A1 | 5/2016 | Qian et al. |
| 2016/0248685 A1 | 8/2016 | Pignataro et al. |
| 2016/0277321 A1 | 9/2016 | Johansson et al. |
| 2016/0277971 A1 | 9/2016 | Hamdi et al. |
| 2016/0294784 A1 | 10/2016 | Hopkins et al. |
| 2016/0344754 A1 | 11/2016 | Rayapeta et al. |
| 2016/0373185 A1 | 12/2016 | Wentzloff et al. |
| 2017/0048328 A1 | 2/2017 | Korotaev et al. |
| 2017/0070531 A1 | 3/2017 | Huston, III et al. |
| 2017/0237719 A1 | 8/2017 | Schwartz et al. |
| 2017/0302554 A1 | 10/2017 | Chandrasekaran et al. |
| 2017/0339022 A1 | 11/2017 | Hegde et al. |
| 2017/0364794 A1 | 12/2017 | Mahkonen et al. |
| 2018/0006923 A1 | 1/2018 | Gao et al. |
| 2018/0091427 A1 | 3/2018 | Kumar et al. |
| 2018/0097787 A1 | 4/2018 | Murthy et al. |

(56) References Cited

U.S. PATENT DOCUMENTS

| | | | |
|---|---|---|---|
| 2018/0097788 | A1 | 4/2018 | Murthy |
| 2018/0097840 | A1 | 4/2018 | Murthy |
| 2018/0124025 | A1 | 5/2018 | Lam et al. |
| 2018/0176036 | A1 | 6/2018 | Butcher et al. |
| 2018/0176192 | A1 | 6/2018 | Davis et al. |
| 2018/0198838 | A1 | 7/2018 | Murgia et al. |
| 2018/0234322 | A1 | 8/2018 | Cohn et al. |
| 2018/0278419 | A1 | 9/2018 | Higgins et al. |
| 2018/0331912 | A1 | 11/2018 | Edmison et al. |
| 2018/0332078 | A1 | 11/2018 | Kumar et al. |
| 2018/0351970 | A1* | 12/2018 | Majumder ............ H04L 63/061 |
| 2018/0367422 | A1 | 12/2018 | Raney et al. |
| 2018/0375644 | A1 | 12/2018 | Karagiannis et al. |
| 2019/0058714 | A1 | 2/2019 | Joshi et al. |
| 2019/0116111 | A1 | 4/2019 | Izard et al. |
| 2019/0166049 | A1 | 5/2019 | Bakshi |
| 2019/0205244 | A1 | 7/2019 | Smith |
| 2019/0260794 | A1 | 8/2019 | Woodford et al. |
| 2019/0303385 | A1 | 10/2019 | Ching et al. |
| 2019/0349403 | A1 | 11/2019 | Anderson et al. |
| 2020/0053064 | A1 | 2/2020 | Oprisan et al. |
| 2020/0067700 | A1 | 2/2020 | Bergeron |
| 2020/0076773 | A1 | 3/2020 | Monat et al. |
| 2020/0104052 | A1 | 4/2020 | Vijayan et al. |
| 2020/0137021 | A1 | 4/2020 | Janakiraman |
| 2020/0137115 | A1 | 4/2020 | Janakiraman et al. |

OTHER PUBLICATIONS

Non-Final Office Action for U.S. Appl. No. 15/608,369 (dated Mar. 7, 2019).
Schulist et al., "Linux Socket Filtering aka Berkeley Packet Filter (BPF)," Wayback Machine, http://www.kernel.org/doc/Documentation/networking/filter.txt, pp. 1-25 (Jun. 8, 2018).
Starovoitov, "[PATCH net-next 6/6] samples: bpf: large eBPF program in C," lkml.org, https://lkml.org/lkml/2014/11/27/10, pp. 1-5 (Nov. 26, 2014).
Andreyev, "Introducing data center fabric, the next-generation Facebook data center network," Data Center Engineering, Networking & Traffic, Production Engineering, https://code.fb.com/production-engineering/introducing-data-center-fabric-the-next-generation-facebook-data-center-network/, pp. 1-10 (Nov. 14, 2014).
Corbet, "Extending extended BPF," LWN.net, https://lwn.net/Articles/603983/, pp. 1-4 (Jul. 2014).
Corbet, "BPF: the universal in-kernel virtual machine," LWN.net, https://lwn.net/Articles/599755/, pp. 1-3 (May 2014).
Git, "Linux Kernel Source Tree," https://git.kernel.org/pub/scm/linux/kernel/git/torvalds/linux.git/tree/samples/bpf/sockex2_kern.c, pp. 1-4 (2018).
Advisory Action for U.S. Appl. No. 15/608,369 (dated Sep. 13, 2019).
Nubeva, "Nubeva TLS Decrypt: Out-of-Band Decrypted Visibility for the Cloud," www.nubeva.com/decryption, pp. 1-8 (Sep. 2019).
Nubeva, "What is Symmetric Key Intercep Architecture?" https://www.nubeva.com/blog/what-is-symmetric-key-intercept-architecture. pp. 1-4 (Aug. 8, 2019).
Final Office Action for U.S. Appl. No. 15/608,369 (dated Jun. 27, 2019).
Notice of Allowance and Fee(s) Due for U.S. Appl. No. 15/826,787 (dated Apr. 25, 2019).
Non-Final Office Action for U.S. Appl. No. 15/826,787 (dated Jan. 3, 2019).
Solution Brief, "Smart Packet Brokering for Mobile Network Operators," Brocade, pp. 1 (Jul. 19, 2017).
Vavilapalli et al., Cord Design Notes, "Cord Monitoring Service," pp. 1-14 (Mar. 14, 2016).
ACG Research, "Business Care for Brocade Network Analytics for Mobile Network Operators," pp. 1-11 (2015).
Ixia Anue GTP Session Controller, Take Control of GTP Monitoring to Improve Customer QoE and Maximize Network ROI, Solution Brief, Document No. 915-6606-01 Rev. A, pp. 1-2 (Sep. 2013).
Ixia Network Visibility Solutions, Anue GTP Session Controller 7433, Product Specifications, Document No. 915-6504-01 Rev. B, pp. 1-3 (May 2013).
Commonly-assigned, co-pending U.S. Appl. No. 16/113,360 for "Monitoring Encrypted Network Traffic Flows in a Virtual Environment Using Dynamic Session Key Acquisition Techniques," (Unpublished, filed Aug. 27, 2018).
Commonly-assigned, co-pending U.S. Appl. No. 16/103,598 for "Methods, Systems, and Computer Readable Media for Implementing Bandwidth Limitations on Specific Application Traffic at a Proxy Element," (Unpublished, filed Aug. 14, 2018).
"Inspection of SSL Traffic Overview," Juniper Networks, pp. 1-4 (Jan. 19, 2011).
Commonly-assigned, co-pending U.S. Appl. No. 16/781,542 for "Methods, Systems, and Computer Readable Media for Processing Network Flor Metadata at a Network Packet Broker," (Unpublished, filed Feb. 4, 2020).
Stankovic, "How to solve duplicated NetFlow caused by multiple exporters," https://www.netvizura.com/blog/how-to-solve-duplicated-netflow-caused-by-multiple-exporters, pp. 1-4 (Accessed Jan. 15, 2020).
"Jumbo Frame," Wikipedia, https://en.wikipedia.org/wiki/Jumbo_frame, pp. 1-4 (Jan. 15, 2020).
"How is the MTU is 65535 in UDP but the ethernet does not allow frame size more than 1500 bytes," ServerFault, TCPIP, pp. 1-9 (Accessed Jan. 15, 2020).
"Network Monitoring Step 2: the Next-Generation of Packet Brokers," MantisNet, pp. 1-6 (2020).
"cPacket cVu 2440NG/3240NG," https://www.cpacket.com/resources/cvu-3240-2440-datasheet/, pp. 1-4 (Accessed Jan. 15, 2020).
"What are Microservices," An Introduction to Microservices, https://opensource.com/resources/what-are-microservices, pp. 1-8 (Accessed Jan. 15, 2020).
"IPv6," Wikipedia, https://en.wikipedia.org/wiki/IPv6, pp. 1-15 (Jan. 8, 2020).
"About NetFlow," Watchguard Technologies, Inc., pp. 1-3 (2019).
"Multiprotocol Label Switching," Wikipedia, https://en.wikipedia.org/wiki/multiprotocol_label_switching, pp. 1-7 (Dec. 6, 2019).
"Netflow," Wikipedia, https://en.wikipedia.org/wiki/NetFlow, pp. 1-9 (Dec. 3, 2019).
"NetFlow Collector," Kentipedia, Kentik, pp. 1-4 (Sep. 17, 2019).
Petryschuk, "NetFlow Basics: an Introduction to Monitoring Network Traffic," Auvik, https://www.auvik.com/, pp. 1-8 (Mar. 19, 2019).
"Automatic versus Manual NetFlow Deduplication," Noction, https://www.noction.com/blog/automatic-manual-netflow-deduplication, pp. 1-7 (Feb. 1, 2019).
Leskiw, "Understanding Syslog: Servers, Messages & Security," https://www.networkmanagementsoftware.com/what-is-syslog/, pp. 1-7 (Oct. 2018).
McGillicuddy, "Next-Generation Network Packet Brokers: Defining the Future of Network Visibility Fabrics," Enterprise Management Associates (EMA) Research, Niagara Networks, pp. 1-27 (Aug. 2018).
"Principles of Chaso Engineering," https://principlesofchaos.org/?lang=ENcontent, pp. 1-3 (May 2018).
"Network Visibility Network Packet Broker Comparison Table," Ixia, pp. 1-10 (2017).
Michael, "NetFlow Deduplication or Flow Deduplication," Plixer, pp. 1-5 (Dec. 3, 2016).
"Feature Brief: FlowVUE Application," Gigamon, pp. 1-3 (2016).
"cPacket Radically Simplifies How Data Center and Cloud Professionals Pinpoint Problems," BusinessWire, pp. 1-3 (Jan. 28, 2013).
Hale, "Netflow V9 Datagram Knowledge Series: Part 2—Netflow V9 Packet Header," Geek Speak, pp. 1-3 (Sep. 7, 2012).
"Understanding Flow and Packet Deduplication," Riverbed Technology, pp. 1-5 (2012).
"NetFlow Version 9 Flow-Record Format," Cisco Systems, pp. 1-12 (May 2011).
Paul, Santanu, "Network Visibility Component with Netflow Jumbo Frame Support," The IP.com Journal, pp. 1-8 (Aug. 2019).
Paul, Santanu, "Methods and Systems for Session-Aware Collection of Netflow Statistics," The IP.com Journal, pp. 1-5 (Jul. 2019).

(56) References Cited

OTHER PUBLICATIONS

Pandey, Shardendu; Johansson, Stefan Jan, "Network Packet Broker with Flow Segmentation Capability," The IP.com Journal, pp. 1-6 (Jul. 2019).
Paul, Santanu, "Network Packet Broker with Flow Segmentation Capability," The IP.com Journal, pp. 1-6 (Aug. 2019).
Paul, Santanu, "Custom Key Performance Indicator (KPI) Network Visibility System," The IP.com Journal, pp. 1-4 (Jul. 2019).
Paul, Santanu, "Self-Healing Network Visibility System," The IP.com Journal, pp. 1-5 (Jun. 2019).
Paul, Santanu, "Network Visibility System with Integrated Netflow Over Syslog Reporting Capability," The IP.com Journal, pp. 1-7 (Jan. 28, 2019).
Evans, David, "Network Packet Broker with Dynamic Filter Rules," The IP.com Journal, pp. 1-8 (Jun. 2018).
Advisory Action and AFCP 2.0 Decision for U.S. Appl. No. 15/608,369 (dated Jul. 1, 2020).
Non-Final Office Action for U.S. Appl. No. 16/113,360 (dated May 19, 2020).
Non-Final Office Action for U.S. Appl. No. 16/103,598 (dated May 11, 2020).
Final Office Action for U.S. Appl. No. 15/608,369 (dated Apr. 22, 2020).
Notice of Allowance and Fee(s) Due for U.S. Appl. No. 15/608,369 (dated Aug. 19, 2020).
Applicant-Initiated Interview Summary for U.S. Appl. No. 16/103,598 (dated Oct. 22, 2020).
Notice of Allowance and Fee(s) Due for U.S. Appl. No. 16/103,598 (dated Oct. 16, 2020).
Notice of Allowance and Fee(s) Due and Examiner-Initiated Interview Summary for U.S. Appl. No. 16/113,360 (dated Oct. 15, 2020).
Non-Final Office Action for U.S. Appl. No. 16/781,542 (dated Sep. 25, 2020).
Sanchez, "Extended BPF and Data Plane Extensibility: an overview of networking and Linux," PLUMgrid, pp. 1-37 (2014).

* cited by examiner

METHODS, SYSTEMS, AND COMPUTER READABLE MEDIA FOR MONITORING ENCRYPTED NETWORK TRAFFIC FLOWS

PRIORITY CLAIM

This application claims the benefit of U.S. Provisional Patent Application No. 62/550,558, filed Aug. 25, 2017, the disclosure of which is incorporated herein by reference in its entirety.

TECHNICAL FIELD

The subject matter described herein relates to passive monitoring of network traffic communications. More specifically, the subject matter relates to methods, systems, and computer readable media for monitoring encrypted network traffic flows.

BACKGROUND

At present, encrypted secure sockets layer (SSL) traffic constitutes a significant amount of the total network traffic communicated over packet networks. Notably, monitoring and processing SSL traffic are computationally expensive tasks that place a large burden on a network's resources. Many network visibility tools actively handle SSL traffic (e.g., SSL records communicated via packets) by acting as a man-in-the-middle (MITM) entity, thereby decrypting and re-encrypting received SSL traffic while extracting a cleartext copy for use by associated network monitoring tools. In a typical SSL proxy architecture, a client device is configured to negotiate an encrypted connection for a secure session (e.g., SSL session) between itself and an SSL proxy. Likewise, the SSL proxy and a destination server subsequently negotiate a second encrypted connection in order to conduct a secure session between the two servers. More specifically, active SSL inspection methods commonly used today involve terminating the SSL connection at a MITM point, decrypting the encrypted traffic data, creating a copy of clear text data to be sent to the out-of-band analysis tool(s), and then re-encrypting the connection prior to sending the encrypted network traffic to its intended destination server. Since the SSL proxy must decrypt and re-encrypt all network traffic (e.g., record traffic and/or packet traffic) before the traffic can be forwarded to the intended recipient, this technique (sometimes referred to as active SSL inspection or full SSL inspection) can introduce severe performance bottlenecks on the processing of live network traffic.

Accordingly, a need exists for methods, systems, and computer readable media for monitoring encrypted network traffic flows.

SUMMARY

Methods, systems, and computer readable for media monitoring encrypted network traffic flows are disclosed. According to one method executed at an encryption aware visibility (EAV) device, the method includes receiving copies of encrypted network traffic flow records belonging to at least one communication session involving a monitored application and obtaining, from a secure session management (SSM) server, session decryption information (SDI) via a secure backchannel interface connection, wherein the session decryption information includes cryptographic keys generated by the SSM server to establish the at least one communication session. The method further includes using the cryptographic keys to decrypt the copies of encrypted network traffic flow records to produce decrypted network traffic flow records.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary non-transitory computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors, network interfaces, and memory.

As used herein, each of the terms 'function', 'engine', and 'module' refers to hardware, which may also include software and/or firmware, for implementing the feature(s) being described.

As used herein, the term "packet" refers to a network packet or any formatted unit of data capable of being transmitted in a computer network, such as protocol data unit, a frame, a datagram, a user datagram protocol packet, a transport control protocol packet, an SSL record, or the like.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for monitoring encrypted network traffic flows. In some embodiments, the disclosed subject matter includes an encryption-aware visibility (EAV) device (e.g., an SSL-aware network packet broker device) that is configured to communicate with a secure session management (SSM) server via a secure backchannel interface connection. Notably, the backchannel interface connection may be used by the EAV device to directly obtain cryptographic key information associated with one or more particular SSL sessions that are being monitored by the EAV device. In some embodiments, the backchannel interface connection may comprise a secure communications connection (e.g., an IPsec tunnel or SSL session) that is established between the EAV device and the secure session management server. Per-session cryptographic key information (e.g., public and private key information) obtained via the backchannel interface connection may be referred to herein as session decryption information (SDI) and may include at least private and public cryptographic key pair information that is associated with a monitored session. In some embodiments, the disclosed subject matter may utilize a per-session key sharing backchannel interface connection that is facilitated using a "push mechanism" (e.g., a Hypertext Transport Protocol (HTTP) push) that is executed by the SSM server (e.g., a secure SSL key server). Namely, the SSM server may be configured to automatically send the session decryption information associated with a monitored application or monitored resource to a designated and/or subscribed EAV device. In other embodiments, a query and response mechanism is utilized by the EAV device to solicit the aforementioned session decryption information using query request messages directed to the SSM server. Moreover, embodiments of the disclosed subject matter illustrate exemplary deployments in the context of a forward secrecy architecture that involves the use of SSL. It will be appreciated that other embodiments of the disclosed subject matter can also be deployed in a generally similar manner to provide the monitoring functionality in an Internet protocol security (IPsec) based encryption environment.

In some instances the disclosed subject matter describes the encryption of packets and the decryption of packets as part of the monitoring of network traffic flows. Although the disclosed subject matter pertains largely to the encryption and decryption of SSL-based 'records' (which may be communicated via one or more packets), it is understood by persons skilled in the art of SSL communications that any description below regarding the encryption and decryption of packets corresponding to a monitored network traffic flow may also include the encryption and decryption of SSL-based records. In some embodiments, a record is a logical portioning that is present at SSL level (above layer 4) and may span multiple packets (i.e., be included in part via multiple packets).

Reference will now be made in detail to various embodiments of the subject matter described herein, examples of which are illustrated in the accompanying drawings. Wherever possible, the same reference numbers will be used throughout the drawings to refer to the same or like parts.

Figure 1:
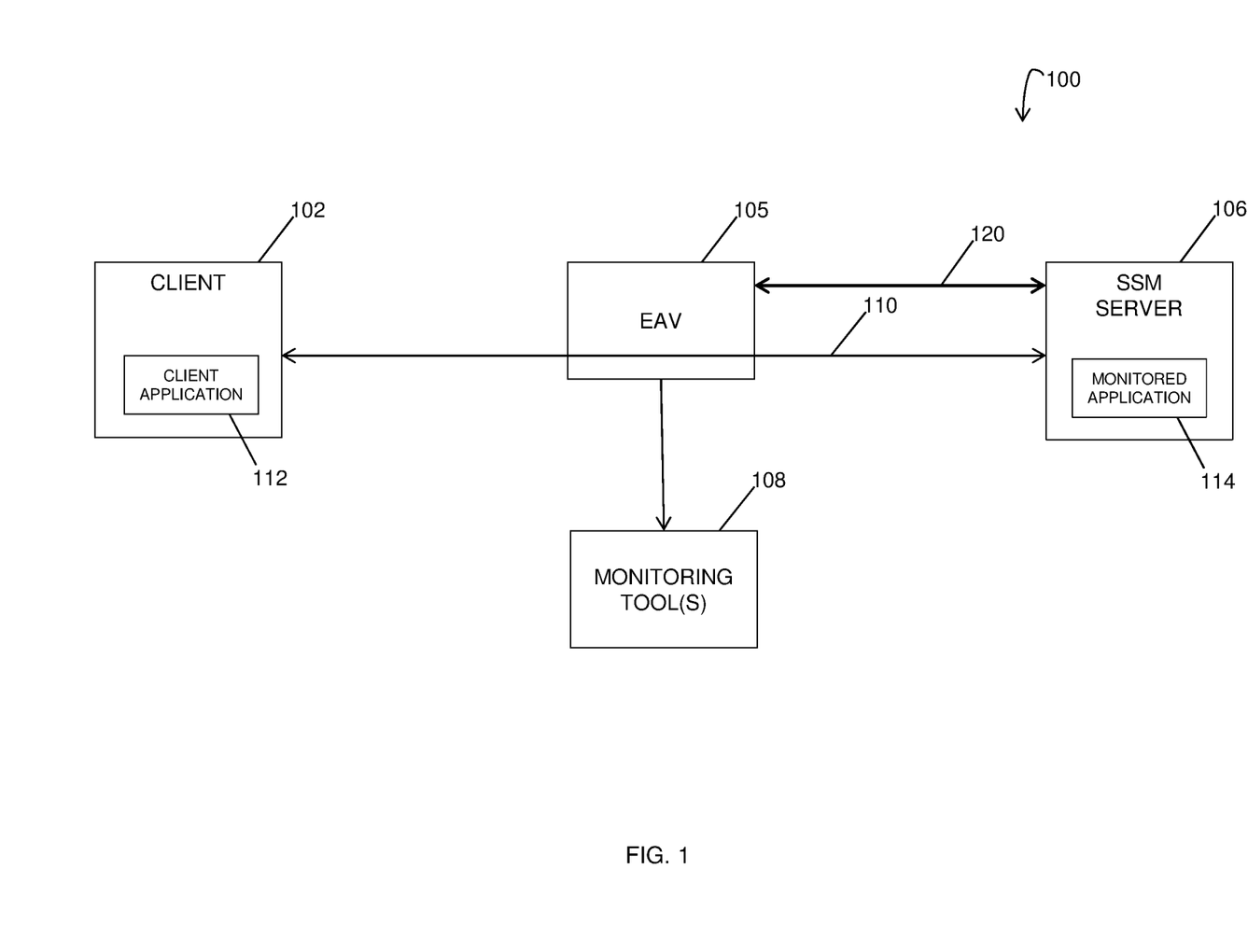
FIG. 1 is a block diagram illustrating an encryption aware visibility (EAV) system that is configured to monitor encrypted network traffic flows according to an embodiment of the subject matter described herein.

FIG. 1 depicts a high level functional block diagram of one exemplary embodiment of the disclosed subject matter. In particular, FIG. 1 illustrates one of the core concepts of the EAV-based monitoring system that is described herein. As shown in FIG. 1, a network environment 100 includes at least one client device 102 that hosts a client application 112. For example, client device 102 may comprise a user endpoint device, such as a smartphone, personal computer, laptop computer, Internet of things (IoT) device, or any other device configured to support and host client application 112. Alternatively, client device 102 may comprise a client application 112 that runs on a virtual machine or container hosted within a cloud-computing environment.

Figure 2:
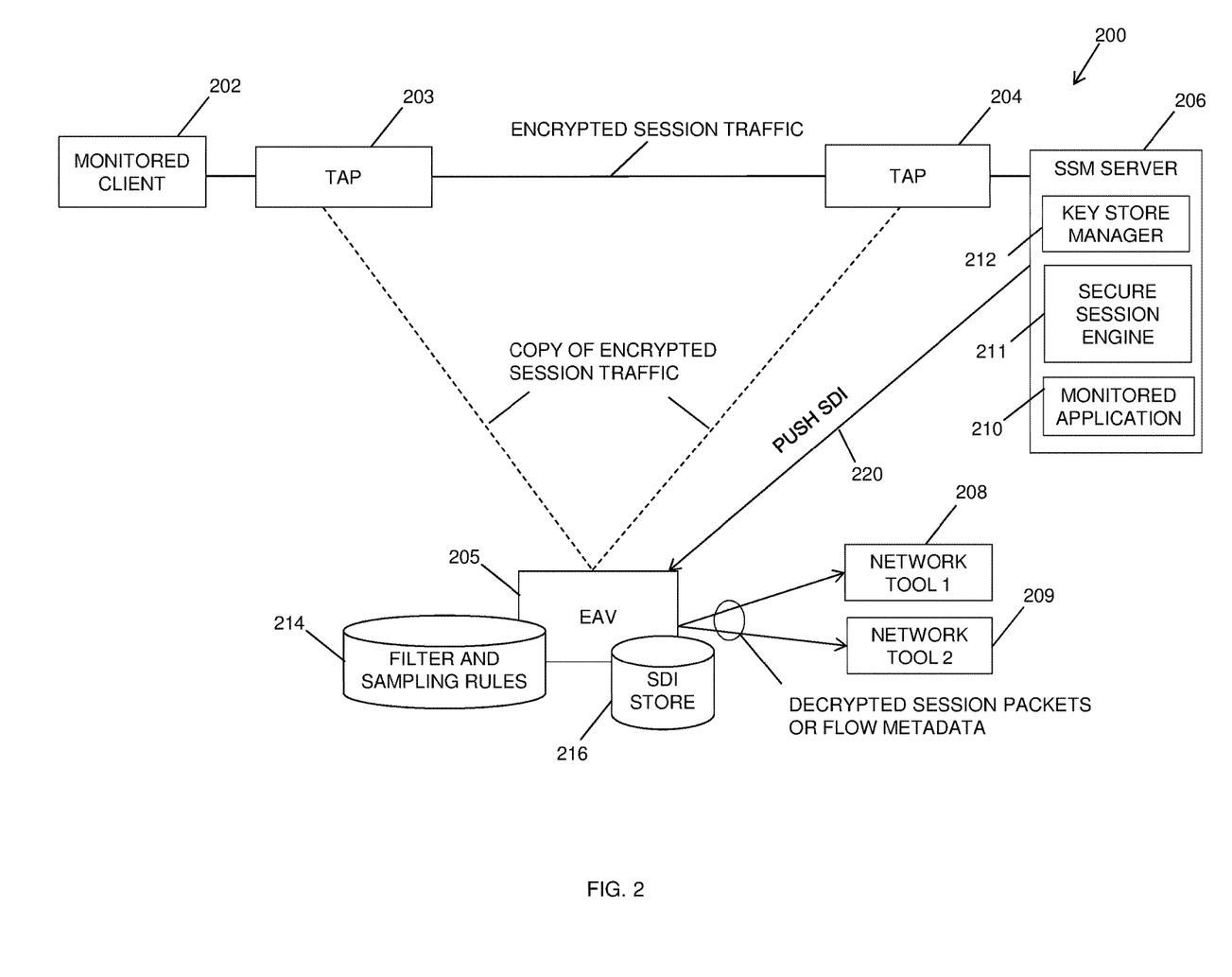
FIG. 2 is a block diagram illustrating an encryption aware visibility (EAV) system that utilizes a push mechanism to obtain session decryption information that is used to monitor encrypted network traffic flows according to an embodiment of the subject matter described herein.
Figure 3:
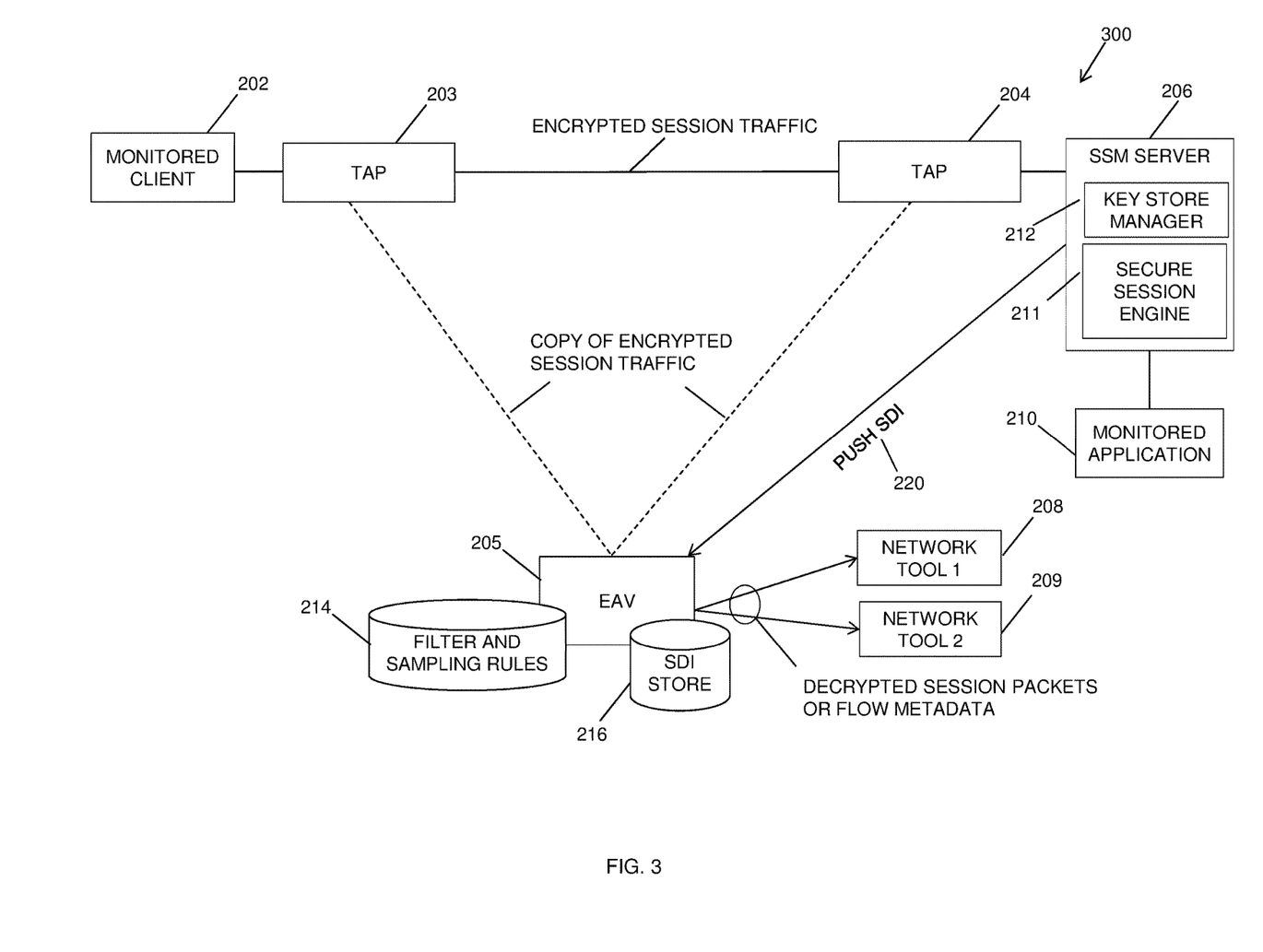
FIG. 3 is a block diagram illustrating an encryption aware visibility (EAV) system that utilizes a push mechanism to obtain session decryption information that is used to monitor encrypted network traffic flows via a proxy secure session management server according to an embodiment of the subject matter described herein.
Figure 4:
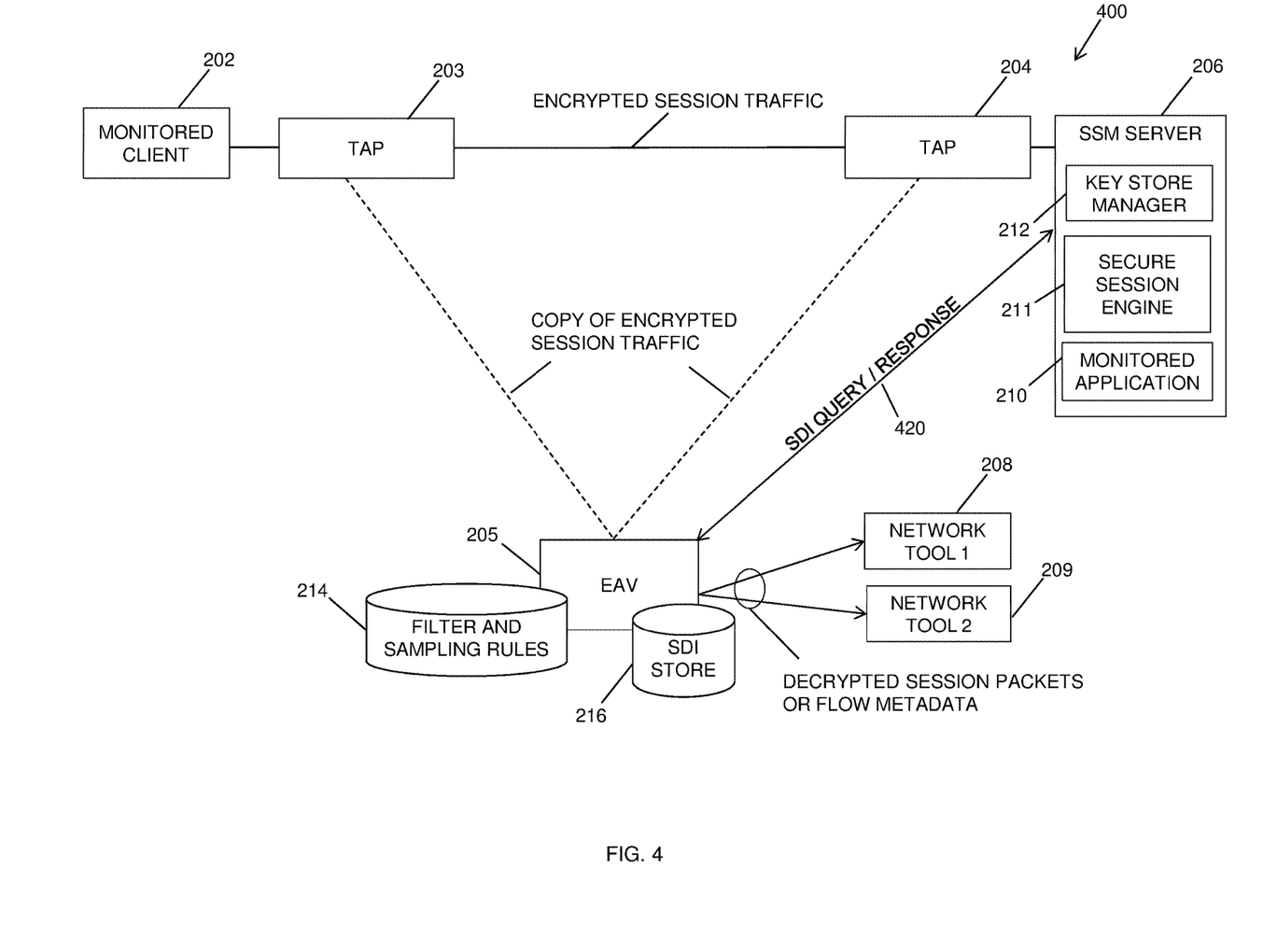
FIG. 4 is a block diagram illustrating an encryption aware visibility (EAV) system that utilizes query and response messages to obtain session decryption information that is used to monitor encrypted network traffic flows according to an embodiment of the subject matter described herein.
Figure 5:
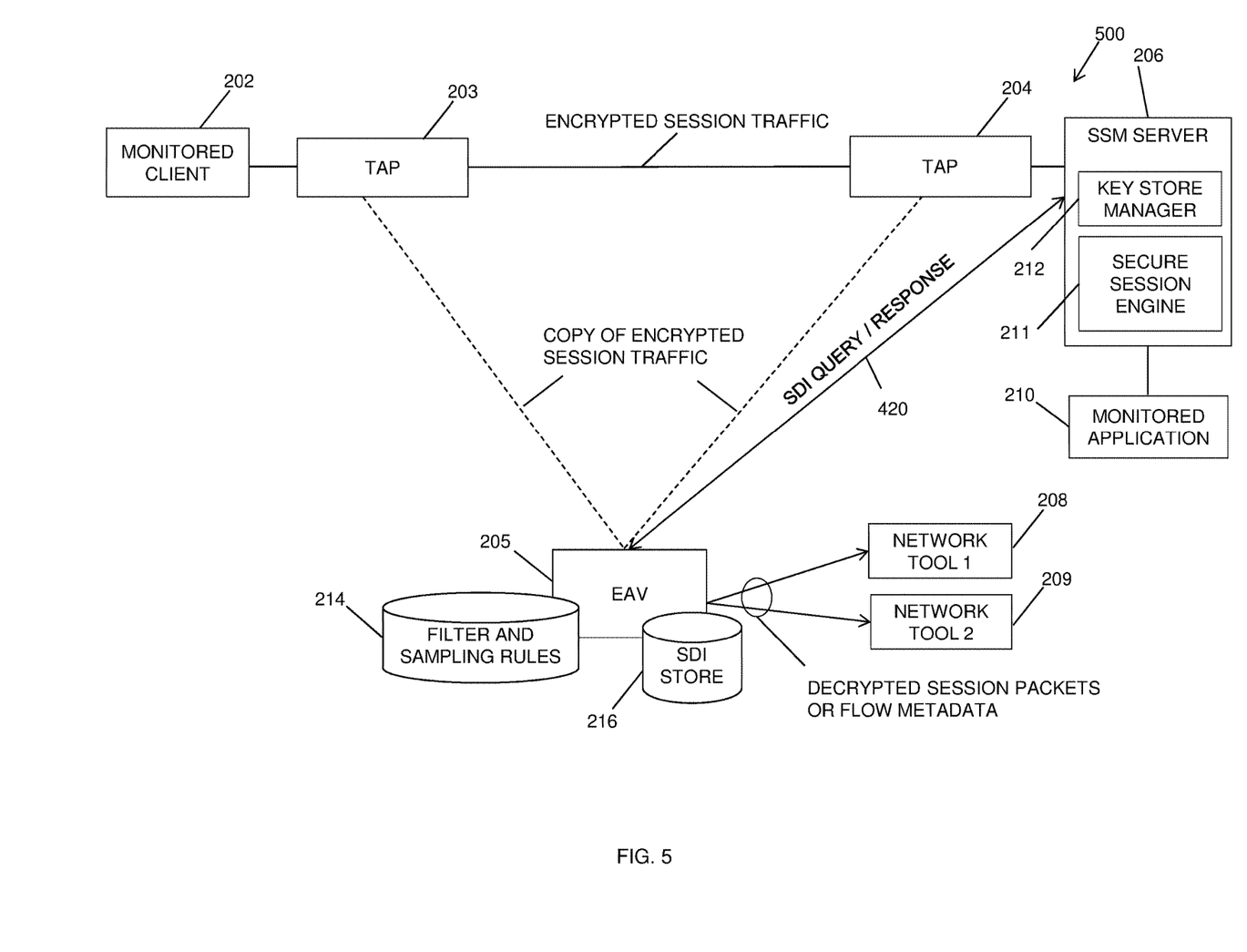
FIG. 5 is a block diagram illustrating an encryption aware visibility (EAV) system that utilizes query and response messages to obtain session decryption information that is used to monitor encrypted network traffic flows via a proxy secure session management server according to an embodiment of the subject matter described herein.

Network environment 100 may also include a secure session management (SSM) server 106 that operates as an application server hosting a monitored application 114. SSM server 106 may be configured to establish SSL sessions with client device 102 in response to receiving secure session requests (from client application 112). In some embodiments, SSM server 106 can be configured for creating, distributing, and storing session decryption information (e.g., ephemeral cryptographic security keys and associated session identification information) for communication sessions traversing a monitored network environment. For example, secure session management server 106 may establish and utilize a secure backchannel interface connection 120 to communicate the session decryption information to EAV device 105. In some embodiments, secure session management server 106 is responsible for generating the cryptographic public and private key pairs for a monitored application server that is establishing an SSL session with a requesting client (e.g., SSM server 106 providing SSL support requested by a monitored application and/or application server as shown in FIGS. 3 and 5 and described below). In other embodiments, the secure session management server and monitored application server constitute the same entity (i.e., the monitored application server is capable of conducting its own SSL key generation and is further configured to establish a secure backchannel interface connection with EAV device 105 for communicating session decryption information to EAV device 105 as shown in FIGS. 2 and 4 and described below). In other embodiments, SSM server 106 may comprise a virtual instance running on a virtual machine or container hosted within a cloud-computing environment.

In some embodiments, client application 112 may initiate an SSL session with monitored application 114. In such a scenario, session decryption information (e.g., public and private key pair data) may be generated and stored by SSM server 106. In some embodiments, the session decryption information may include elliptic curve Diffie-Hellman ephemeral (ECDHE) cryptographic security keys (e.g., public and private key pair data). Further, SSM server 106 may maintain a key store (not shown in FIG. 1) that is configured to store data that identifies monitored communication sessions (e.g., a session involving the monitored application 114) as well as the session decryption information corresponding to the monitored communication session. For example, SSM server 106 may include a key store database that includes entries that map public key and private key pairs to one or more monitored session identifiers. Exemplary session identifier may include a client application identifier, a client device identifier, a monitored application identifier, a monitored application device identifier, a VLAN identifier, or a SSL-based identifier.

FIG. 1 further depicts network environment 100 as including an EAV device 105. In some embodiments, EAV device 105 comprises an SSL-aware network packet broker (NPB) device configured to monitor network traffic flow records in a passive manner. EAV device 105 may also be configured to maintain a list of sessions that have been designated to be monitored. In some embodiments, a network operator may provision EAV device 105 with session identifiers that indicate specific applications and/or sessions that require monitoring or surveillance. For example, a session list may include a number of entries, wherein each of the entries includes at least one session identifier, such as a client application identifier, a client device identifier, a monitored application identifier, a monitored application device identifier, a VLAN identifier, IP address identifier, source port identifier, and/or an SSL-based identifier (e.g., a public cryptographic key value). Further, these identifiers can be dynamically changed and/or on-demand based on automation. Notably, the session list maintained by EAV device 105 includes session identifiers that correspond to one or more of the session identifiers included in the key store database managed by SSM server 106 (as described above).

In some embodiments, EAV device 105 may be configured to permit encrypted network traffic flows 110 communicated between client device 102 and secure session management server 106 (or a monitored application server) to pass through EAV device 105. EAV device 105 may be configured to inspect network traffic flows communicated over sessions that have been designated for monitoring. After identifying an encrypted packet or record associated with a network traffic flow designated for monitoring, EAV device 105 is configured to create a copy of the packet or record and forward the original received packet or record to its intended destination. In some embodiments, EAV device 105 may be alternatively connected to one or more network tap elements or probes (not shown) that are configured to identify and copy packets/records of monitored network traffic flows. Such copies of the network traffic flows are then forwarded to EAV device 105 by the monitoring taps/probes (see FIGS. 2-5 and description below). In some embodiments, EAV device 105 may also be provisioned with sufficient storage (or granted access to sufficient non-local storage) to store the copies of encrypted records and/or packets of the monitored sessions.

As indicated above, EAV device 105 is further configured to establish a secure backchannel interface connection 120 with secure session management server 106. In some embodiments, backchannel interface connection 120 is established as a separate and dedicated SSL session or an IPsec tunnel between EAV device 105 and secure session management server 106. In some examples, backchannel interface connection 120 may be established and initiated by SSM server 106. SSM server 106 can be provided with the EAV's IP address, port address, and MAC address (as well as a certificate). Based on the address data received, SSM server 106 can establish a backchannel interface connection 120 with EAV device 105 through proper authentication and verification. Such a measure also ensures SSM server 106 is not monitoring or listening to any port where SSM server 106 is providing secured information. In another embodiment, backchannel interface connection 120 may instead be initiated and established by EAV device 105. For example, SSM server 106 monitors and/or listens to a secured port from which server 106 expects communications from EAV device 105. The certificate and authorization needed to securely communicate with SSM server 106 is initially configured in, and subsequently provided by, EAV device 105. In both the examples presented above, SSM server 106 utilizes Hypertext Transport Protocol Secure (HTTPS) along with certificate validations during the establishing of backchannel interface connection 120. In some examples, SSM server 106 may optionally, and/or additionally, implement two-factor authentication based on Open Web Application Security Project (OWASP) and SANS standards for the purposes of guarding against any man-in-the-middle attacks. Further, backchannel interface connection 120 may be established on-premises inside a demilitarized zone (DMZ) to ensure that none of the SDI traverses/flows outside of the network. Similarly, network address translation (NAT) functionality of backchannel interface connection 120 may be prevented by one or more of EAV 105 and SSM server 106.

Once established, backchannel interface connection 120 may be used by EAV device 105 to receive session decryption information (e.g., public and private cryptographic key pair information) for a session originally requested by client device 102. In some embodiments, secure session management server 106 may be configured to initiate the distribution of the session decryption information by automatically "pushing" the session decryption information (e.g., private and public cryptographic key information and session identification information) to one or more subscribed/designated EAV devices 105 at or near the time when the public and private cryptographic key pairs are created (see FIGS. 2-3 and description below for more detail). As previously indicated, SSM server 106 is configured to maintain an authorization list of encryption-aware EAV system nodes/elements that are authorized or subscribed to receive SDI related to a monitored session. Notably, EAV devices (e.g., EAV device 105) included in the authorization list maintained by SSM server 106 are designated to receive the "pushed" session decryption information in real-time (e.g., as the SDI is generated) or in accordance with a SDI provisioning schedule established by a network operator. For example, SSM server 106 may push public and private key pair information to each subscribed EAV device via separate backchannel interface connections (e.g., backchannel interface connection 120) as soon as the public and private key information is generated by SSM server 106.

In other embodiments, EAV device 105 can use a query/response mechanism to obtain session decryption information (e.g., a public and private key pair) from secure session management server 106 via backchannel interface connection 120 (see FIGS. 4-5 and description below for more detail). For example, EAV device 105 may send a query message to SSM server 106 via backchannel interface connection 120 that requests cryptographic key pair data that is associated with a particular session identifier (i.e., that is included in the request message sent by EAV device 105). In some embodiments, EAV device 105 may generate and send a query request message that includes SSL-based identification information, such as a public key value that corresponds to a session designated for monitoring.

For example, EAV 105 may already possess the session information for any particular session since EAV 105 has access to all the network traffic provided via network monitoring taps (e.g., taps 203-204 depicted in FIG. 2). In particular, EAV 105 may acquire and possess knowledge of public keys, random numbers being used, cipher size, elliptical curve sizes, and the like from session data provided by the network monitoring taps. In some embodiments, EAV 105 can be configured to send a query request message containing session related information to prompt SSM server 106 to provide a private key (and/or SDI) for a particular session. Notably, SSM server 106 can respond by providing a corresponding private key through backchannel interface connection 120. In this manner, a user or operator of EAV 105 has the option to selectively monitor and decrypt certain network traffic.

In some embodiments, after receiving the query request message, SSM server 106 accesses a key store (not shown) using the received public key value to identify the appropriate stored session decryption information (e.g., by locating a matching public key value and corresponding private key value in the key store). SSM server 106 subsequently provides the requested session decryption information (e.g., cryptographic key pair) to the EAV device 105 via secure backchannel interface connection 120. In some embodiments, secure session management server 106 is configured to use an EAV device identifier contained in the received request message to cross-reference the authorization list to determine whether a response message is to be sent to EAV device 105. Notably, if the EAV device identifier (which was included in the original request message from the EAV device) matches an identifier listed in the authorization list, secure session management server 106 may be configured to query the key store and/or send a response message containing the requested session decryption information to the requesting EAV device (e.g., EAV device 105).

After EAV device 105 receives the session decryption information from secure session management server 106 via backchannel interface connection 120, EAV device 105 may decrypt the copied packets and/or records of the encrypted traffic flow(s) 110. In other embodiments, EAV device 105 may receive a copy of encrypted traffic flow(s) 110 from monitoring tap elements or monitoring probe elements if EAV device 105 does not directly receive or handle encrypted traffic flow(s) 110 communicated between client device 102 and SSM server 106. In either scenario, EAV device 105 is configured to decrypt the copies of the obtained encrypted records using the session decryption information received from SSM server 106.

Afterwards, EAV device 105 may then inspect the network traffic flow records and/or packets decrypted with the session decryption information (i.e., private key value) and perform NPB functions (e.g., filtering, sampling, de-duplication, and/or data masking) on the decrypted network traffic flow records and/or packets. For example, after the encrypted network traffic flow packets and/or records are decrypted by EAV device 105 using the obtained session decryption information, the decrypted packets/records are subsequently processed by one or more packet broker filtering rules and/or sampling rules provisioned in EAV device 105. In particular, the rules are used by EAV device 105 to determine which packets and/or records are to be forwarded to one or more out-of-band network tools 108 (e.g., via NPB tool ports). EAV device 105 may also apply processing operations that modify the packets or the associated packet flow (e.g., replication, de-duplication, data masking, etc.) prior to forwarding packets to the appropriate out-of-band network tools 108 (e.g., via NPB tool ports). NPB functions performed by EAV device 105 are conducted at a greater throughput rate as compared to a MITM network element that implements active SSL decrypt/encrypt inspection. After assessing and determining the proper network tool destinations, EAV device 105 forwards the decrypted session records and/or flow metadata accordingly.

It will be appreciated that FIG. 1 is for illustrative purposes and that various depicted entities, their locations, and/or their functions described above in relation to FIG. 1 may be changed, altered, added, or removed without departing from the scope of the disclosed subject matter.

FIG. 2 depicts a block diagram of an exemplary embodiment of an EAV-based monitoring system that includes a monitored communication session between a monitored client 202 and a monitored application 210. For purposes of FIG. 2, the communicated session is SSL-encrypted using a per-session encryption technique, such as ECDHE. In some embodiments, monitored client 202 may comprise a monitored client application hosted by a client device (e.g., a computer, mobile device, and the like). Monitored client 202 may alternatively be embodied as a virtual client entity. Monitored application 210 may be any application that is communicatively accessible by client devices and client applications. As shown in FIG. 2, monitored application 210 may be hosted locally by SSM server 206 (which is thereby also serving as a host application server). Notably, SSM server 206 (and/or secure session engine 211 as described below) is configured to provide SSL services to monitored application 210, which is being monitored by the EAV system (i.e., EAV device 205 and tap elements 203 and 204) in network environment 200.

In some embodiments, SSM server 206 include a cryptographic key store manager 212 (e.g., SSL key store) and a secure session engine 211. In some embodiments, key store manager 212 may be hosted by a separate SSL key server (not shown) that is distinct from SSM server 206. In such scenarios, the SSM server and the key server may communicate via an implementation dependent application programming interface (API).

SSM server 206 may be configured to create, distribute, and store session-specific cryptographic key pairs that can be used to encrypt and decrypt SSL records and/or packets associated with a monitored SSL session between monitored client 202 and monitored application 210. In some embodiments, SSM server 206 (and/or secure session engine 211) may receive a session initiation request directed to monitored application 210 from client 202 and be configured to establish an SSL session with client 202 to securely communicate data (e.g., data provided by monitored application 210) via records or packets. In such a scenario, secure session engine 211 hosted by SSM server 206 may be configured to generate a public and private cryptographic key pair for use in its SSL session initiation handshake with monitored client 202. Secure session engine 211 may subsequently provide and/or store the generated cryptographic keys with key store manager 212.

Key store manager 212 may be configured to manage and store the cryptographic keys in a local key store. For example, key store manager 212 of SSM server 206 may be configured to store session decryption information that includes an identifier that identifies the session (e.g., a session identifier, session identifier tuple, etc.) and a public key value to be used for establishing a secure session between client 202 and monitored application 210. Session decryption information also include a private key value corresponding to monitored application 210 that is used by SSM server 206 to establish a secure session with monitored client 202. Key store manager 212 is further configured to provide the session decryption information upon request to EAV device 205. For example, key store manager 212 may be configured to "push" the session decryption information to EAV device 205. Further, SSM server 206 and/or key store manager 212 may be adapted to maintain a list of authorized encryption aware EAV devices or system nodes that are associated with a monitoring system. In some embodiments, SSM server 206 and/or key store manager 212 may configured to automatically push both private and public session key and session identification information to one or more subscribed EAV devices at or near the time of creation of the cryptographic key pairs. In instances where SSM server 206 is also the monitored application server (e.g., the same server as depicted in FIG. 2), SSM server 206 may communicate the public cryptographic key to the monitored client 202.

In some embodiments, SSM server 206 maintains session identifier data that identifies, or can be used to identify, a communications session between the monitored client 202 and monitored application 210, as well as the public and private cryptographic keys associated with that monitored session. Further, secure session engine 211 of SSM server 206 may be configured to maintain a listing of EAV devices that are configured to monitor at least one particular session and provide the session decryption information to the appropriate EAV devices at the time the cryptographic keys are generated by SSM server 206.

As shown in FIG. 2, network environment 200 includes monitoring tap elements 203 and 204 (which may be virtual machines or physical probes/devices) are used to observe and generate copies of encrypted network traffic flow records and/or packets associated with a monitored session between monitored client 202 and monitored application 210. Notably, tap elements 203 and 204 are passive packet/record copying devices that do not perform SSL proxy server or gateway functions, but receive session identifiers corresponding to monitored session from secure session engine 211 (and/or SSM server 206). In some embodiments, the session traffic comprising records and/or packets is encrypted for the communication between monitored client 202 and monitored application 210 using ECDHE, or some other per-session, public and private cryptographic key encryption technique. Tap elements 203 and 204 are interposed in the network environment 200 so as to passively copy the records and/or packets that are associated with a secure monitored communication session between client 202 and monitored application 210. The copied network traffic flow records and/or packets are relayed and/or forwarded by tap elements 203 and 204 to EAV device 205. Notably, the copied network traffic flow records and/or packets received by EAV device 205 retain their original encryption.

In some embodiments, each of monitored client 202, tap elements 203 and 204, monitored application 210, SSM server 206, secure session engine 211, and key store manager 212 may be virtualized elements (e.g., virtual instances or virtual machines) in a cloud-based and/or virtualized environment. For example, each of tap elements 203 and 204 may comprise a virtual instance of a software-based monitoring agent application that is used to observe and generate copies of records and/or packets associated with a monitored session. In some examples, the records and/or packets are encrypted for communication between monitored client 202 and monitored application 210 using ECDHE, or some other per-session public/private key encryption technique.

Further, each of monitoring tap elements 203 and 204 may be deployed as virtualized elements in separate cloud computing virtual environments (e.g., network environment 200 may employ network virtualization and/or cloud computing), so as to be embodied by one or more virtual machines or virtual computing clusters. In some embodiments, a virtual monitoring tap agent may be deployed in tandem with a virtual application server that is to be monitored, such that the virtual monitoring tap is capable of observing and passively creating copies of monitored network traffic flow records or packets associated with a secure communication session between monitored client 202 and monitored application 210. The copied monitored network traffic flow records and/or packets retain their original encryption and are forwarded to a virtualized EAV device 205.

As shown in FIG. 2, EAV device 205 includes a secure signaling and/or communications interface, which is configured to receive session decryption information, such as per-session public and private cryptographic key pair information associated with a monitored secure session that is automatically "pushed" (or published) by SSM server 206. In some embodiments, backchannel interface connection 220 is a direct and secure backchannel interface. In some embodiments, the disclosed subject matter involves techniques by which EAV device 205 may be configured to obtain, decrypt, and filter/process the monitored session traffic that has been secured via the use of a per-session public/private key-based encryption scheme without functioning as an active SSL proxy. Namely, EAV device 205 is not required to both decrypt and subsequently re-encrypt packets associated with a monitored secure session while being interposed between monitored client 202 and application 210. Although FIG. 2 depicts a backchannel interface connection 220 established directly between EAV device 205 and SSM server 206, it is understood that backchannel interface connection 220 may alternatively be directly established between EAV device 205 and key store manager 212 without departing from the scope of the disclosed subject matter.

In some embodiments, SSM server 206 is configured to automatically push the session decryption information to EAV device 205 at the time that the session decryption information is created by SSM server 206. EAV device 205 is configured to store the session decryption information received from SSM server 206 (and/or key store manager 212) via backchannel interface connection 220 in SDI store 216. EAV device 205 may then subsequently use the stored session decryption information to decrypt copies of monitored network traffic flow records (and/or packets) associated with the session, wherein the record copies are provided by the deployed tap elements 203 and 204 (or monitoring probes). In this manner, EAV device 205 is configured to monitor, decrypt and inspect secure session traffic flow records in monitored network environment 200, while avoiding the processing bottleneck(s) associated with prior active SSL monitoring/decryption approaches.

After receiving and decrypting the network traffic flows, EAV device 205 may be configured to accessing a rules module 214, which may contain a number of filtering and sampling rules for processing the decrypted packets and/or records. For example, EAV device may access rules module 214 to perform NPB functions that include tasks such as filtering, sampling, de-duplication, data masking, and the like at a much higher throughput rate than an EAV device that implements active SSL decryption and/or encryption inspection. EAV device 205 may also forward the processed packets to an appropriate network tool (e.g., network tools 208-209) or network tool port.

FIG. 3 Illustrates a system architecture variation of the embodiment previously described and illustrated in FIG. 2. Notably, network environment 300 includes a SSM server 206 that provides SSL support for monitored application 210. In such embodiments, monitored application 210 may be hosted by a host application server (not shown) whose SSL services are supported by SSM server 206. In particular, secure session engine 211 of SSM server 206 may be configured to establish an SSL session with monitored client 202 in lieu of the application server hosting monitored application 210. However, all other functionality with respect to utilizing session decryption information and backchannel interface connection 220 as described above with respect to embodiment described in FIG. 2 is conducted in the same manner by SSM server 206 and EAV device 205. Likewise, although FIG. 3 depicts a backchannel interface connection 220 established directly between EAV device 205 and SSM server 206, it is understood that backchannel interface connection 220 may alternatively be directly established between EAV device 205 and key store manager 212 without departing from the scope of the disclosed subject matter.

FIG. 4 depicts an embodiment in which the secure backchannel interface is utilized to facilitate the exchange of query and response messages between EAV device 205 and SSM server 206 in network environment 400. As shown in FIG. 4, EAV device 205 is adapted to send a query message requesting session decryption information to SSM server 206 (and/or key store manager 212) directly via the backchannel interface connection 220. The query message from EAV device 205 may function as a request for public and private cryptographic key pair information for a specific monitored session. The query message sent to the SSM server 206 includes session identification information that may be used by SSM server 206 to obtain the related cryptographic key information. For example, the query message sent by EAV device 205 may include an SSL parameter, such as a public key value corresponding to a monitored session. The query message is received by secure session engine 211, which in turn extracts session identification information, such as the public key value, from the query message.

In some embodiments, secure session engine 211 also checks an authorization list for an EAV device identifier to determine whether an SDI check and/or response message is sent back to EAV device 105. For example, if an EAV device identifier (which was included in the original query message sent by EAV device 105) matches an identifier listed in the authorization list, secure session engine 211 may be configured to query the key store manager and/or send a response message containing the requested session decryption information to the requesting EAV device (e.g., EAV device 105).

Secure session engine 211 subsequently forwards the public key value (or other session identifier) to key store manager 212. Notably, key store manager 212 may use the public key value to locate associated session decryption information, which includes the corresponding private key value. For example, key store manager 212 may search key pair entries in the local key store using the public key value received in the query message to find a matching public key value and its corresponding private key value. This session decryption information is then obtained by key store manager 212 and subsequently provided to EAV device 205. In some embodiments, key store manager 212 and/or SSM server 206 may generate and send a response message that includes the session decryption information requested by EAV device 205. For example, key store manager 212 sends the response message containing the session decryption information to EAV device 205 via the backchannel interface connection 420. Although FIG. 4 depicts a backchannel interface connection 420 established directly between EAV device 205 and SSM server 206, it is understood that backchannel interface connection 420 may be directly established between EAV device 205 and key store manager 212 without departing from the scope of the disclosed subject matter.

After receiving the response message, EAV device 205 is configured to store the session decryption information received from SSM server 206 and to subsequently use this session decryption information to decrypt copies of monitored network traffic flow records (and/or packets) associated with the monitored session. Notably, the record copies are provided to EAV device 205 by the deployed tap elements 203 and 204 (e.g., monitoring probes). As such, EAV device 205 is configured to monitor, decrypt and inspect secure session traffic flow records in real-time in monitored network environment 200, while avoiding the processing bottleneck(s) associated with prior active SSL monitoring/decryption approaches. After decrypting the packets using the session decryption information, EAV device 205 utilizes the session decryption information in a similar fashion as described above in FIG. 2.

FIG. 5 Illustrates a system architecture variation of the embodiment previously described and illustrated in FIG. 4. Notably, network environment 500 includes a SSM server 206 that provides SSL support for monitored application 210. In such embodiments, monitored application 210 may be hosted by a host application server (not shown) whose SSL services are supported by SSM server 206. In particular, secure session engine 211 of SSM server 206 may be configured to establish an SSL session with monitored client 202 in lieu of the application server hosting monitored application 210. However, all other functionality with respect to utilizing session decryption information and backchannel interface 420 as described above with respect to embodiment described in FIG. 4 is conducted in the same manner by SSM server 206 and EAV device 205. Similarly, although FIG. 5 depicts a backchannel interface connection 420 established directly between EAV device 205 and SSM server 206, it is understood that backchannel interface connection 420 may be directly established between EAV device 205 and key store manager 212 without departing from the scope of the disclosed subject matter.

Figure 6:
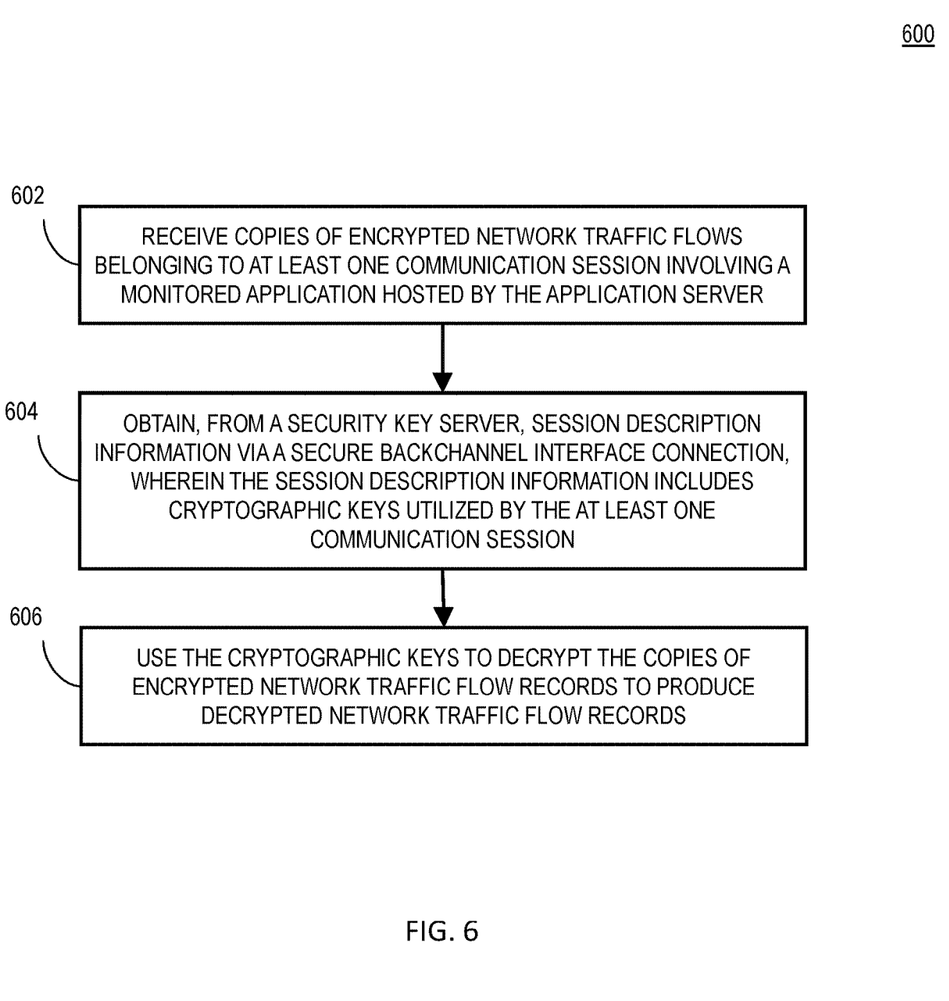
FIG. 6 is flow diagram illustrating a process for monitoring encrypted packet packets according to an embodiment of the subject matter described herein.

FIG. 6 is a flow diagram illustrating a process for monitoring encrypted network traffic flows according to an embodiment of the subject matter described herein. In some embodiments, process 600, or portions thereof, may be performed by or at EAV device 205, and/or another node or module associated with EAV device 205 as shown in FIGS. 2-5. In some embodiments, process 600 may include an algorithm comprising steps 602, 604, and/or 606 that is stored in memory and executed by a processor (e.g., memory and processor of EAV device 205).

In step 602, copies of encrypted network traffic flows belonging to at least one communication session (e.g., involving a monitored application) are received. In some embodiments, one or more tap elements or probes is responsible for providing encrypted packet data to an EAV device.

In step 604, session decryption information is obtained from a secure session management server. In some embodiments, an EAV device obtains session decryption information from an SSM server via a secure backchannel interface connection. Notably, the session decryption information includes a cryptographic key pair (e.g., public and private keys) generated by the SSM server for establishing the at least one communication session (e.g., for a session involving the monitored application). In one example, the session decryption information is automatically pushed across the secure backchannel interface connection by the SSM server to an EAV device, which is previously designated (e.g., subscribed) to receive session decryption information for particular session. The session may be designated by the session identifier, such as an SSL-based public key value. In another embodiment, the session decryption information obtained from the secure session management server via the secure backchannel interface connection is received by the EAV device in response to a query message sent by the EAV device to the SSM server.

In step 606, the copies of the encrypted network traffic flows are decrypted using the cryptographic keys to produce decrypted network traffic flows. In some embodiments, the EAV device is configured to use the session decryption information obtained in step 604 to properly identify and decrypt encrypted network traffic flows corresponding to a monitored session.

In addition, the decrypted network traffic flows may be sent to a packet analyzer. For example, the EAV device may be configured to send the decrypted network traffic flows to one or more packet analyzers or out-of-band monitoring tools. In some embodiments, the packet analyzer is a virtual entity residing completely within the virtual environment. In other embodiments, the package analyzer may be a hardware-based packet analyzer that is configured to receive unencrypted network traffic flows from a communicatively connected virtual tap element.

It will be appreciated that process 600 is for illustrative purposes and that different and/or additional actions may be used. It will also be appreciated that various actions described herein may occur in a different order or sequence.

It should be noted that each of the EAV device, the SSM server, and/or functionality described herein may constitute a special purpose computing device. Further, the EAV device, the SSM server, and/or functionality described herein can improve the technological field of monitoring encrypted network traffic flows involving monitored devices and applications by implementing a passive inspection mechanism. For example, an EAV device may be provided with public and private keys associated with a particular monitored session via direct and secure backchannel interface connection. Notably, the EAV device does not need to decrypt and re-encrypt network traffic communicated involving a monitored device/application. As such, the session-aware EAV device can inspect and perform NPB functions, such as filtering, sampling, de-duplication and data masking at a much higher throughput rate than a device that implements active SSL decryption.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
    at an encryption aware visibility (EAV) device:
        receiving copies of encrypted packets belonging to at least one communication session involving a monitored application, wherein the copies of encrypted packets are received from one or more monitoring tap elements, wherein each of the one or more monitoring tap elements is a passive packet copying element that is separate from the EAV device;
        obtaining, from a secure session management (SSM) server that hosts the monitored application, session decryption information (SDI) via a secure backchannel interface connection directly connecting the EAV device and the SSM server, wherein the session decryption information includes cryptographic keys used to establish the at least one communication session, wherein the secure backchannel interface connection is separate and distinct from a connection existing between the SSM server and the one or more tap elements; and
        using the cryptographic keys received from the SSM server to decrypt the copies of encrypted packets to produce decrypted packets.

2. The method of claim 1 wherein each of the one or more monitoring tap elements, the SSM server, and the EAV device is a virtual machine operating in a virtual environment.

3. The method of claim 1 wherein the session decryption information obtained from the SSM server via the secure backchannel interface connection is automatically pushed across the secure backchannel interface connection by the SSM server.

4. The method of claim 1 the session decryption information obtained from the SSM server via the secure backchannel interface connection is received by the EAV device as a response to a query message sent by the EAV device to the SSM server.

5. The method of claim 1 wherein the monitored application is hosted locally by the SSM server.

6. The method of claim 1 wherein the SSM server provides secure sockets layer (SSL) support for an application server that hosts the monitored application.

7. A system comprising:
    a secure session management (SSM) server configured to generate session decryption information, wherein the session decryption information includes cryptographic keys used to establish at least one communication session involving a monitored application, wherein the SSM server is a host application server that hosts the monitored application; and
    an encryption aware visibility (EAV) device configured to receive, copies of encrypted packets belonging to the at least one communication session involving the monitored application, wherein the copies of encrypted packets are received from one or more monitoring tap elements, obtain, from a secure session management server, the session decryption information via a secure backchannel interface connection directly connecting the EAV device and the SSM server, wherein the secure backchannel interface connection is separate and distinct from a connection existing between the SSM server and the one or more tap elements, and decrypting the copies of encrypted packets using the session decryption information to produce decrypted packets, wherein each of the one or more monitoring tap elements is a passive packet copying element that is separate from the EAV device.

8. The system of claim 7 wherein each of the one or more monitoring tap elements, the EAV device, and the secure session management server is a virtual instance of a virtual machine.

9. The system of claim 7 wherein the session decryption information obtained from the secure session management server via the secure backchannel interface connection is automatically pushed across the secure backchannel interface connection by the secure session management server.

10. The system of claim 7 wherein the session decryption information obtained from the secure session management server via the secure backchannel interface connection is received by the EAV device in response to a query message sent by the EAV device to the secure session management server.

11. The system of claim 7 wherein the monitored application is hosted locally by the SSM server.

12. The system of claim 7 wherein the SSM server provides secure sockets layer (SSL) support for an application server that hosts the monitored application.

13. A non-transitory computer readable medium having stored thereon executable instructions embodied in the computer readable medium that when executed by at least one processor of a computer cause the computer to perform steps comprising:

at an encryption aware visibility (EAV) device:

receiving copies of encrypted packets belonging to at least one communication session involving a monitored application, wherein the copies of encrypted packets are received from one or more monitoring tap elements wherein each of the one or more monitoring tap elements is a passive packet copying element that is separate from the EAV device;

obtaining, from a secure session management (SSM) server that hosts the monitored application, session decryption information (SDI) via a secure backchannel interface connection directly connecting the EAV device and the SSM server, wherein the session decryption information includes cryptographic keys used to establish the at least one communication session, wherein the secure backchannel interface connection is separate and distinct from a connection existing between the SSM server and the one or more tap elements; and using the cryptographic keys received from the SSM server to decrypt the copies of encrypted packets to produce decrypted packets.

14. The non-transitory computer readable medium of claim 13 wherein each of the one or more monitoring tap elements and the SSM server is a virtual machine operating in a virtual environment.

15. The non-transitory computer readable medium of claim 13 wherein the session decryption information obtained from the SSM server via the secure backchannel interface connection is automatically pushed across the secure backchannel interface connection by the SSM server.

16. The non-transitory computer readable medium of claim 13 wherein the session decryption information obtained from the SSM server via the secure backchannel interface connection is received by an EAV device as a response to a query message sent by the EAV device to the SSM server.

17. The non-transitory computer readable medium of claim 13 wherein the monitored application is hosted locally by the SSM server.

* * * * *